United States Patent [19]
Franz et al.

[11] Patent Number: 4,561,372
[45] Date of Patent: Dec. 31, 1985

[54] SHIP WITH A PIPING SYSTEM ARRANGED ON AN INNER DECK

[75] Inventors: Hans-Joachim Franz, Kölln-Reisiek; Karl-Otto Sadler, Hamburg; Willi Schmidt, Ellerbek, all of Fed. Rep. of Germany

[73] Assignee: Blohm & Voss AG, Hamburg, Fed. Rep. of Germany

[21] Appl. No.: 580,613

[22] Filed: Feb. 16, 1984

[30] Foreign Application Priority Data

Feb. 16, 1983 [DE] Fed. Rep. of Germany ....... 3305323

[51] Int. Cl.[4] .............................................. B63B 25/08
[52] U.S. Cl. .................................... 114/74 R; 141/89; 141/99
[58] Field of Search .......................... 114/74 R, 74 A; 141/367, 368, 89, 99

[56] References Cited
U.S. PATENT DOCUMENTS
3,205,848 9/1965 Matthews ......................... 114/74 R FOREIGN PATENT DOCUMENTS
456183 3/1950 Italy ................................... 141/74 R Primary Examiner—Jesus D. Sotelo
Attorney, Agent, or Firm—Nils H. Ljungman

[57] ABSTRACT

A piping system in a maritime structure, such as a ship, is subdivided into individual piping units at predetermined intervals in the longitudinal and/or lateral direction along lateral or longitudinal dividing planes. The piping units are disposed and supported on removable pallets mounted on a surface in the interior of the ship, e.g., on a selected deck, or bottom deck of the ship. The open ends of corresponding mating pipes of adjacent piping units are arranged at the dividing planes. The corresponding pipes of one piping unit and corresponding mating pipes of adjacent piping units are connected in a fluid-tight manner by means of removable pipe connectors. The dividing planes may advantageously be made to coincide with a grid having lines which are drawn to divide a deck length and width uniformly. The piping units may be standardized and prefabricated.

44 Claims, 7 Drawing Figures

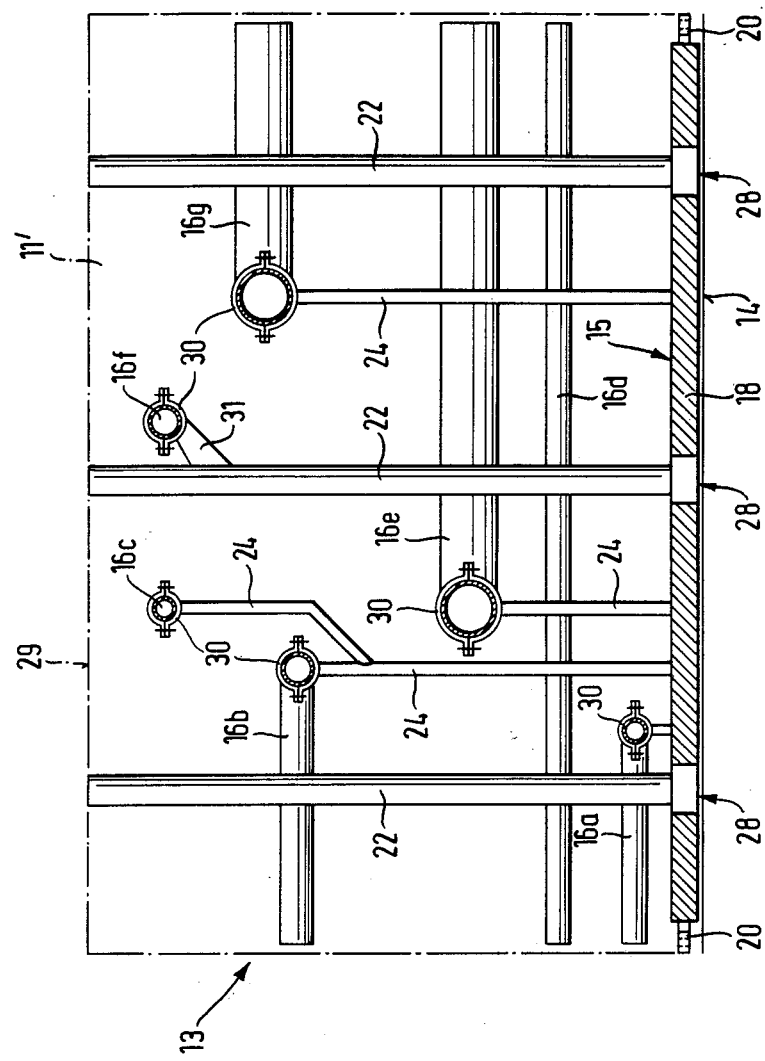

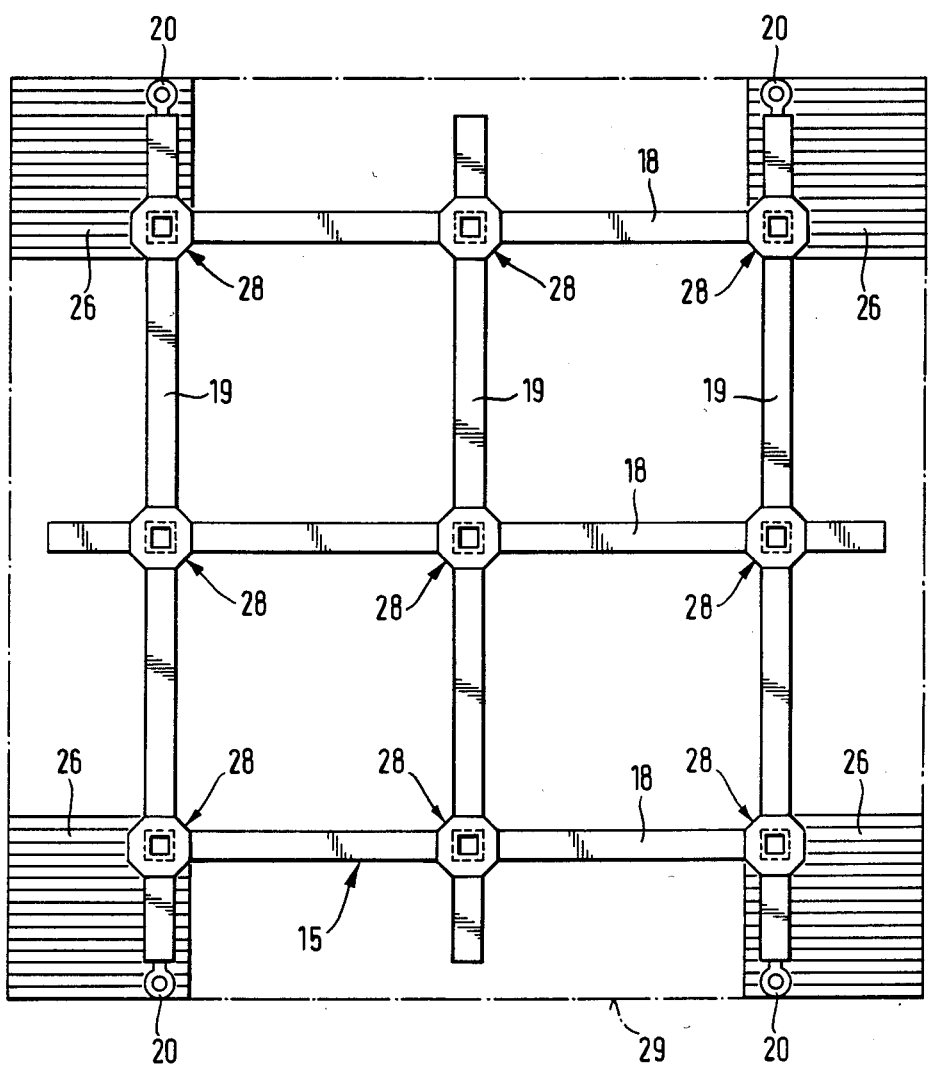

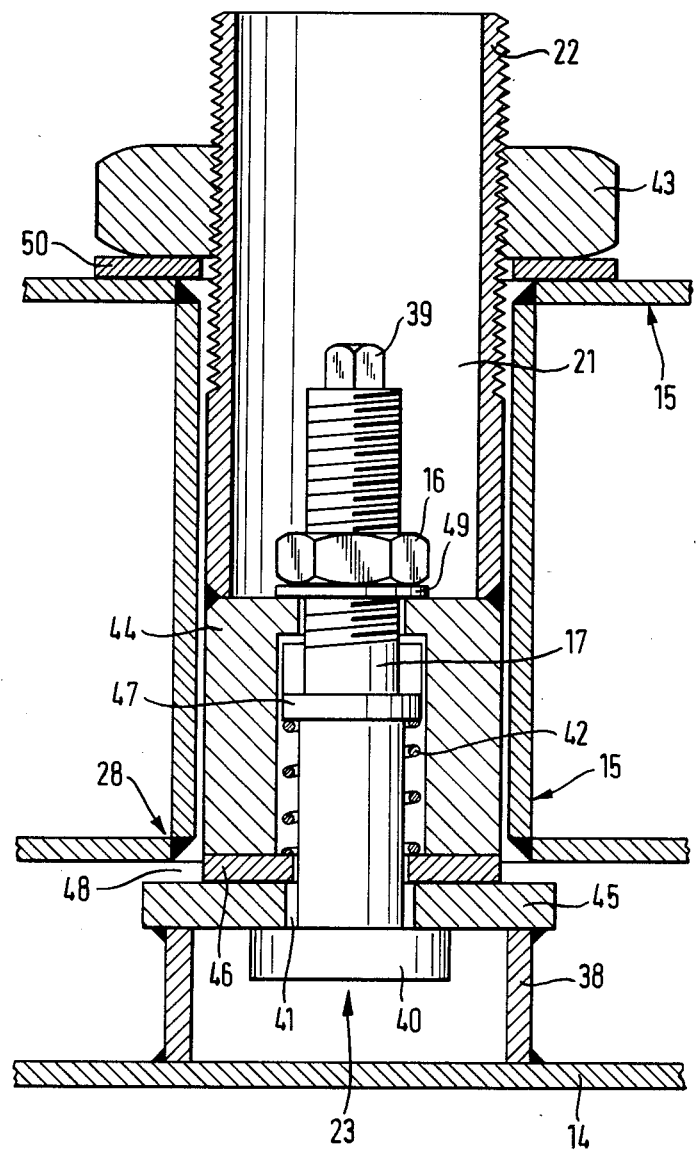

SHIP WITH A PIPING SYSTEM ARRANGED ON AN INNER DECK

BACKGROUND OF THE INVENTION

The invention concerns a maritime structure, such as a ship, particularly a warship, with at least one piping system for the conveying of fluids such as water, oil, air, steam, etc., arranged on a deck located in the interior of the ship, and in particular, on the floor of such a deck.

Such piping systems, according to conventional prior art construction methods, are arranged at the bottom of ships in very close-packed crowded arrangements. Because of the considerable packing density of the individual pipes under the floor and in the bilge, it is frequently not possible to clean and maintain the bottom of the ship without partially dismantling the pipes. In addition, repairing of damaged pipes or removing rust from the pipes is also rendered extremely difficult for these reasons, especially lack of access. These problems could only be solved by removing bunches of entire assemblies of pipes from the piping system in order to create the necessary access. This procedure, however, requires considerable effort in that the removed pipes have to be rewelded, and is furthermore disadvantageous in that, subsequent rewelding of pipe sections may result in leakages and accidental removal of paint, causing additional difficulties at a later time.

OBJECT OF THE INVENTION

The object of the present invention is to provide a ship of the type described at the outset, in which the installed pipes as well as the floor of the ship supporting the pipes can be made accessible with relatively little effort and in which the installation of piping systems is considerably simplified during original construcrion of the ship. Rapid changeover to another piping system using the invention should also be possible, which is advantageous, for example, if the ship is to receive a different type of drive, for example, when changing over from a gas turbine drive to a diesel engine drive.

To solve this problem, the invention provides that the piping system is subdivided into individual piping units or modules at predetermined intervals in the longitudinal and/or lateral direction along vertical lateral or longitudinal dividing planes, said units being arranged on removable pallets located on deck or on the floor of the ship, and that the open ends of corresponding pipes of adjacent piping modules are arranged at corresponding coordinates of the dividing planes and the corresponding mating pipes are connected in a fluid-tight manner by means of removable pipe connectors or joints, such as flanged joints.

SUMMARY OF THE INVENTION

The invention is based on the concept that the piping system is subdivided into modular piping units, and the individual piping units can be assembled and dismantled relatively easily. Thus, it is possible, by removing one or more piping units, to create free access to the deck or the floor of the ship and also to the pipes, so that necessary cleaning, painting and/or repair work can be performed without difficulty.

The invention in its broad form relates to a maritime structure having a plurality of decks and at least one piping system arranged on and supported by a deck floor located in the interior of the structure, said piping system being used for conveying fluids and extending in three dimensions and comprising a plurality of subdivided individual pipe units formed by dividing said piping system by at least first and second sets of planes, said first set comprising selected ones of a plurality of uniformly spaced vertical planes parallel to a length of the maritime structure, said second set comprising selected ones of a plurality of uniformly spaced vertical planes disposed laterally of said first set of planes, each said pipe unit including a removable pallet mounted in use on said deck floor, each said pipe unit including open pipe ends lying on selected of said vertical planes, said open pipe ends of each pipe unit aligning with corresponding open pipe ends of adjacent mating pipe units in assembly, said piping system including removable and adjustable pipe connectors disposed at said open pipe ends for effecting fluid-tight connection of corresponding aligned mating pipes of adjacent pipe units in assembly, whereby the pipe units can be prefabricated, transported, installed and inventoried with efficiency and improved economy.

One particular advantage of the invention is during construction of the ship, since the piping units on the pallets can be prefabricated in suitable workshops outside of the ship simultaneously with the manufacture of the hull of the ship. Upon manufacture of the pallets, equipped with piping units, for assembly, these must then only be passed into the ship's hull through suitable assembly openings, mounted at the appropriate location and then connected to adjacent piping units by means of the pipe connectors.

An additional significant advantage of a ship constructed according to the invention lies in the fact that when changing over, for example, to another type of drive on the ship, the entire piping system can be replaced without difficulty, by removing the piping units along with the pallets which are no longer necessary and replacing them with different prefabricated piping units along with associated pallets.

Furthermore, individual defective piping units or modules can be replaced by similar, prefabricated piping units, thereby significantly reducing the "down time" of the ship for repair purposes. In case of a defective piping unit on a ship at sea, for instance, a replacement piping unit arranged on a similar pallet can be ordered by radio, which then is ready for installation when the ship arrives at a prearranged port and can be exchanged with defective piping unit in a short amount of time.

Pipe connectors for corresponding pipes of adjacent piping units are preferably of the type which are already fixed in a chosen manner at one of the pipe ends; mating portions of connectors may be slid into place on the mating pipe end by means of a suitable, simple tool, thus providing a fluid-tight connection. It is also possible to use automatic devices which simultaneously move all pipe connectors, to connect or disconnect corresponding pipes, if desired.

Preferably, all pallets have the same horizontal dimensions for standardization; the pallets may be rectangular, or preferably be even of square cross section.

Exceptionally, in areas where the pipes rest on contoured surfaces, for example, in narrow machine rooms, it may also be necessary to adapt the dimensions and configuration of the pallets to the shape of the ship.

It is particularly advantageous if the horizontal dimensions of the pallets are based on a horizontal unit grid which covers the floor plan of the ship; the ship may include longitudinal and lateral support elements, bulkheads, longitudinal walls and preferably also support bases, hatches, assembly and/or access openings which are aligned or arranged according to the unit grid. The invention is especially useful in conjunction with a unit grid system as described in the copending patent application Ser. No. 580,611 filed, Feb. 16, 1984, entitled "Ship with Several Decks and Longitudinal and Lateral Support Elements Along the Length of the Decks", and assigned to the same assignee as the present invention.

In another embodiment of the invention, to achieve high stability/weight ratios for the pallets, the pallets are comprised of cross-shaped lateral and longitudinal beams, with preferably equal longitudinal or lateral spacing and fixed to one another at the points of intersection. The lateral and longitudinal beams are expediently designed as I-beams.

The pallets preferably have a somewhat smaller periphery than the piping units, thus facilitating accurate mounting in the grid system of the ship, unhindered by adjacent pallets.

Lifting lugs may expediently be arranged on the pallets in order to facilitate installation and removal of the pallets. The lifting lugs are preferably placed on the sides of the pallets inside the periphery of a piping unit.

Advantageously, for transport inside the ship, the pallets may be equipped with vertically adjustable rollers.

In order to securely mount the pallets on a deck or on the ship's floor, according to another embodiment of the invention, interlock openings may be provided, at least around the periphery of some pallets, and preferably distributed throughout the pallet, particularly at the points of intersection of the lateral and longitudinal beams.

For mounting the pipes on the pallet, mounting columns may be arranged on the pallet, preferably at the points of intersection of the lateral and longitudinal beams. The height of the mounting columns may advantageously correspond to the height of the piping unit.

A floor which can be walked on is preferably mounted on top of the mounting columns.

It is furthermore desirable if the columns are tube-shaped and if they support the interlocking mechanisms at their lower ends. In this way, the pallets can be locked by means of the columns and a suitable tool. In this case, the mounting columns serve not only to support a floor surface, but also to mount the pallet to the underlying ship bottom or floor.

In addition, vertical support struts corresponding to the height of the individual pipes can be used to mount the tubes on the pallet.

In order to achieve the most orderly, compact and clear arrangement possible, the open ends of all pipes should be perpendicular to the lateral or longitudinal dividing planes. It is also advantageous if the pipes on the pallet have pipe sections which are only parallel to the one of the dividing planes, and right angle bends. Furthermore, it is advantageous if the pipes are at least partially arranged in superjacent horizontal planes.

To ensure accurate prefabrication of individual pipe blocks arranged on pallets, another embodiment of the invention is characterized in that the dividing planes are subdivided into an orthogonal coordinate grid, and the open ends of the pipes are only situated at the coordinate intersection points.

As long as a horizontal unit grid system having a grid line spacing of 50–70 cm., (preferably 60 cm.), is used on the ship, the horizontal or vertical spacings of the coordinate intersection points may be 10 to 14 cm., and particularly about 12 cm. In this way, the inventive piping system can be easily adapted to the unit grid system.

To facilitate erection of pipes according to the invention, free spaces are expediently provided at the corners of the pallet. Also within the pallet, erection spaces free from pipes can be furnished in the coordinate grid as needed.

BRIEF DESCRIPTION OF THE DRAWINGS

The invention is explained below with the help of the examples illustrated in the attached drawings, in which:

FIG. 2 is a schematic sectional view along line II13 II of FIG. 1, FIG. 3 is a plan view of the pallet analogous to FIG. 1a, showing the free spaces to be provided, FIG. 6 is an enlarged sectional view of an interlock mechanism for a pallet according to the invention, located on the deck of a ship.

DESCRIPTION OF THE PREFERRED EMBODIMENTS

Figure 1:
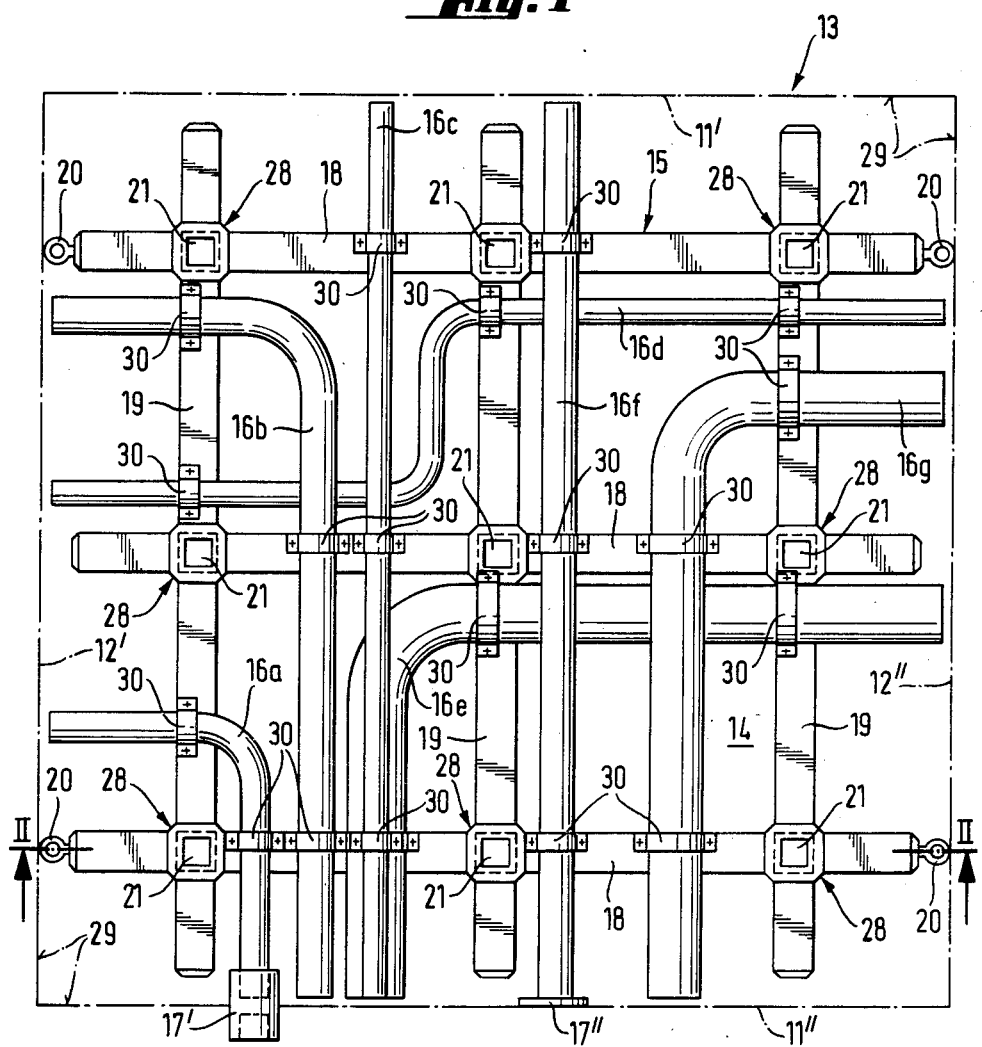
FIG. 1 is a schematic plan view of a piping unit arranged on a pallet according to the invention.
Figure 1A:
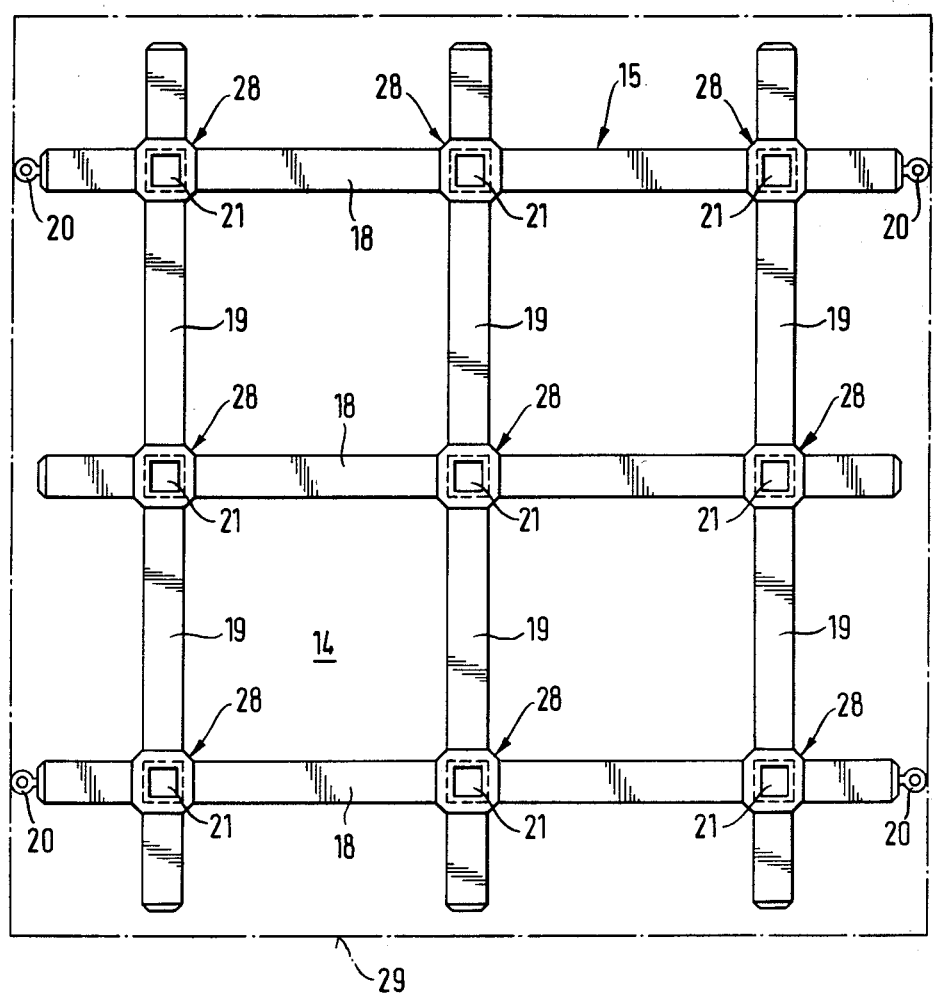
FIG. 1a is a plan view analogous to FIG. 1, showing only the pallet.

According to FIGS. 1, 1a and 2, the pallet 15 according to the invention is comprised of three equally spaced lateral I-beams 18 and three equally spaced longitudinal I-beams 19 which intersect with said lateral I-beams. Suitable reinforcements are provided at the intersection points 28. Furthermore, vertical interlock openings 21 are furnished at the intersection points 28, which are used to mount the pallet 15 on the bottom 14 of the ship.

As illustrated in FIG. 2, tubular columns 22 extend upwards vertically from the intersection points 28 to the height of the floor surface, which is not shown in the drawing, but which is assumed to be statically mounted on the upper ends of the tubular columns 22.

At the ends of the front and back lateral beams 18, mounting lugs 20 are provided, with which the pallets, together with the structural components mounted on the pallets, can be lifted by means of a crane, for example, and which can also be used during transport. As shown in FIGS. 1 and 1a, the pallet is arranged in a grid square 29, the sides of which are, for example, 180 cm. long. The grid square 29 may also have other dimensions. The pallet 15 can also have dimensions which are multiples of a grid unit cell.

It is important that the ends of the beams 18, 19 and situated at a certain distance from the sides of the grid square, so that, for example, the mounting lugs 20 can be placed in the resulting space. It is more advantageous, however, if lifting lugs are arranged at the tops of the tubular columns 22, since they are much more readily accessible there. The connections are then made at the height of the floor. The tubular columns 22 must be connected to the pallets in such a way that they are able to transfer the lifting forces to the pallets.

As shown in FIG. 2, various essentially vertical support uprights 24 are arranged between the mounting columns 22 to which the pipes 16a, 16b, 16c, 16d, 16e, 16f and 16g are connected by means of pipe clamps 30, in the manner shown in FIGS. 1 and 2. Pipe 16f is supported by the middle mounting column 22 by means of a connecting plate 31.

The open ends of the pipes 16a–16g are all perpendicular to the lateral dividing planes 11′, 11″ or longitudinal dividing planes 12′, 12″ located at the sides of the grid square 29. The pipe ends are spaced at a small distance from these dividing planes, and this space is subsequently bridged by means of pipe connectors, gaskets, etc.

Figure 4:
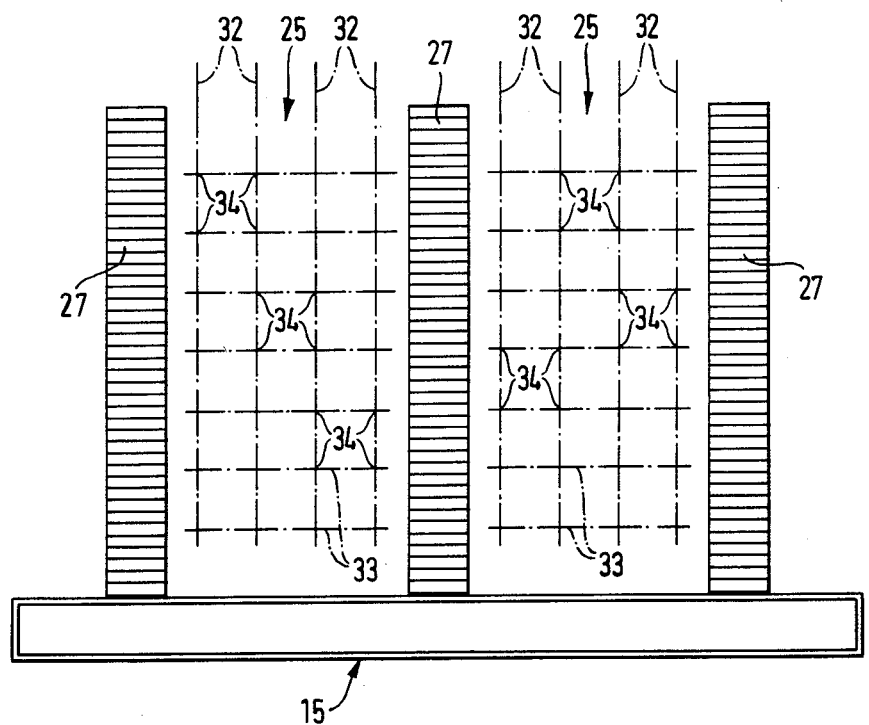
FIG. 4 is a front view of a pallet according to the invention, showing the coordinate grid system which is furnished for the laying of the pipes.

As shown in FIG. 2, each of the pipes 16a–16g essentially lies in a horizontal plane, whereby the individual horizontal planes are spaced at various distances apart, but within a predetermined coordinate system (FIG. 4). The individual pipe sections run parallel to the sides of the grid square 29 and the pipe bends are at right angles, as shown in FIG. 1.

The pipes 16a–16g together form a square-shaped piping unit 13.

Adjacent piping units are arranged on identical pallets 15 in such a way that when juxtaposing two mating piping units, the pipe ends are exactly aligned; the mating pipes (16a–16g) of adjacent pallets can be connected in a fluid-tight manner by means of pipe connectors 17′ (FIG. 1) or by sealing mating flanges 17″.

FIG. 3 shows an additional plan view of the pallet 15 according to the invention, wherein, however, the lifting lugs 20 are arranged at the ends of the longitudinal beams 19; and the outer lateral beams 18 do not project beyond the corner intersection points 28. Instead, the lifting lugs 20 may be provided at the ends of lateral beams 18, in which case the outer ends of longitudinal beams 19 may be cut short to form clearances. At these locations, essentially square-shaped erection clearances 26 are provided. These erection clearances are kept free from pipes.

FIG. 4 shows a front view of a schematically represented pallet 15 according to the invention, with a superimposed orthogonal coordinate grid 25, which is comprised of equally spaced vertically coordinate lines 32 and equally spaced horizontal coordinate lines 33. In the example illustrated, the spacing between adjacent coordinate lines 32, 33 is 12 cm., for instance. This dimension is particularly suitable for the erection of the inventive piping system in a ship having a unit grid system in which the basic grid unit is 60 cm.

In the arrangement shown diagrammatically in FIG. 4, the pipes are laid with their axes passing through the intersection points 34 of the coordinate lines 32, 33.

As seen from the illustration in FIG. 4, two coordinate grids 25 are arranged, one on each side of the pallet, each grid having four vertical coordinate lines 32 and seven horizontal coordinate lines 33. Between the two coordinate grids 25 are erection clearances 27, which are kept free from pipes.

Figure 5:
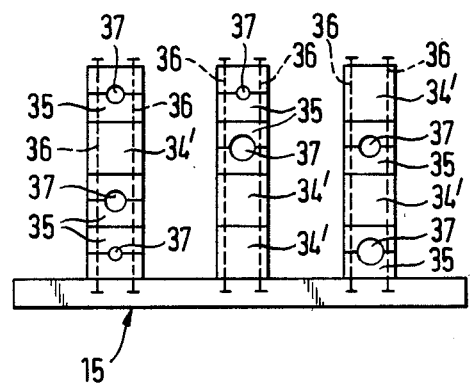
FIG. 5 is a front view of another embodiment of a pallet with a piping unit arranged on top of it.

The front views of the pallet 15 with the superimposed coordinate grid on the left or right in FIG. 4 are substantially similar to the front view shown in FIG. 5.

FIG. 5 shows schematically how, for example, the individual pipes can be mounted in the coordinate grid system according to FIG. 4 by means of pipe clamps. All pipe clamps may be in the form of blocks of equal size, so that when these clamps 35 are stacked one on top of the other, the coordinate grid dimensions according to FIG. 4 can be maintained. Coordinate intersection points 34 at which no pipes are planned are represented by corresponding dimensioned empty blocks 34′.

All stacked blocks 34′ or pipe clamps 35 can be joined to one another or to the pallet 15 by means of pins 36.

Pipe diameters of different sizes can be accommodated by different corresponding dimensions of the openings 37 in the pipe clamps 35.

In addition pipe clamp columns 35′ made up of stacked blocks 34′ and pipe clamps 35, can also be arranged at suitable locations on the pallet 15. Pipe clamp columns 35′ are also provided which are rotated 90° around the vertical axis of the plane with respect to the illustration in FIG. 5. The number and arrangement of pipe clamp columns 35′ is a function of the number and arrangement of pipes to be supported.

FIG. 6 shows one possible design of an interlock mechanism 23, with which a pallet 15 can be mounted on the deck floor of a ship in the area of an intersection point 28.

At the intersection points of a ship's unit grid, along which the longitudinal and lateral support elements are arranged, mounting brackets 38 are expediently connected to the bottom 14 which are rigidly joined with the pallet 15 at the intersection points 28 of longitudinal and lateral I-beams.

As illustrated in FIG. 6, this is accomplished by virtue of the fact that the tubular mounting columns 22 are furnished with interlock openings 21, at the bottom of which is a slide lock type interlock mechanism 23, which, utilizing a pin 17 with an axially projecting square end 39 at the top, can be operated by means of a long tool inserted into the column from above. The pin 17 is threaded at the top, onto which a nut 16 is threaded. At the bottom of the pin 17 is an elongated crossbar 40, which operates in conjunction with a slot-like opening 41 in a plate 45 mounted on a bracket 38 on the bottom 14. In the interlock position as shown in FIG. 6, the crossbar 40 is perpendicular to the slot-like opening 41.

The pin 17 extends through a mounting block 44 at the lower end of the column 22. Upon tightening the nut 16, the crossbar 40 is pressed against the plate 45 from below.

A helical compression spring 42 between the base 46 of the block 44 and a flange 47 on the pin 17 stresses the pin upwards.

As shown in the illustration, the column 22 has external threads on the lower end, onto which a nut is threaded, which restricts upward motion of the pallet 15 with respect to the column 22. By tightening the nut 43, the pallet can be stressed downwards until it contacts the plate 45 of the bracket 38.

Since the pallet 15 has a larger number of intersection points and corresponding mounting columns 22, it is possible that a gap 48 remains at some locations between the bottom of the pallet and the plate 45, as shown in FIG. 6. At most locations, however, the pallet 15 must rest on the plate 45, hence on the bottom 14, for proper support.

Washers 49, 50 may be placed between the nuts 16, 43 and the clamping surfaces they act upon.

The interlock mechanism shown in FIG. 6 is loosened as follows:

First the locknut 16 is loosened by means of a tool inserted into the tubular column 22 from above. Then another tool can be placed on the square end 39 from above. Upon releasing the clamping effect by means of the nut 16, the square end 39 can be turned until the crossbar 40 is aligned with the slot-like opening 41. Because of corresponding dimensions of the crossbar 40 relative to the opening 41, the crossbar can then easily be passed upwards through the opening, with the help of the helical compression spring 42 when the tool is removed from the square end 39. When all interlock mechanisms 23 at the intersection points have been loosened, the pallet 15 can be raised upwards. Because the lifting takes place utilizing lifting lugs disposed on the columns 22, the mounting block 44 should be joined to the pallet 15 in such a way that lifting forces are transferred through the column 22 to the pallet 15.

The locking sequence is the reverse of the above loosening procedure, i.e., first the pallet is lowered onto the bracket 38 so that the crossbar 40 passes through the slot-like opening 41. By placing a tool on the square end 39 of the pin 17, downward pressure is applied against the force of the spring 42 until the crossbar 40 has completely passed through the opening 41. Then the tool is turned 90° and removed, and the locknut 16 is tightened. The locked position as shown in FIG. 6 is then once again attained.

While it is preferable in the arrangement according to FIG. 6 that only the columns 22 be connected to the plates 45 in the manner described, then the pallet 15 lowered and locked in place with the nuts 43, the pallet can alternatively be rigidly fixed to the column 22, so that the two can be manipulated together.

The floor can also be supported by supports connected to the pipes.

Furthermore, it is to be noted that the tubular columns 22 need not necessarily be present. If they are not included, clearances must remain at these locations for the operation of the still existent interlock mechanisms at the intersection points.

The mounting lugs are preferably removable. Clearances are to be provided at the corners for the removal of the mounting lugs or for the attachment of vertically adjustable travel rollers as needed.

The foregoing is an exemplary description of preferred embodiments of the invention. It should be noted that the invention is not to be taken as limited to all the details thereof, since, modifications and variations of the invention are possible and may be made without departing from the spirit or scope of the invention.

What is claimed is:

1. In a maritime structure having a plurality of decks, a piping system arranged on and supported by a mounting surface located in the interior of the structure, said piping system being used for conveying fluids and having an assembly extending in three dimensions, said piping system comprising a plurality of subdivided individual piping units formed as modules by dividing said piping assembly by at least first and second sets of planes, said first set comprising selected ones of a plurality of uniformly spaced substantially vertical planes parallel to a length of the maritime structure, said second set comprising selected ones of a plurality of uniformly spaced substantially vertical planes disposed laterally of said first set of planes, each said piping unit including a removable pallet mounted in use on said mounting surface of the maritime structure, each said piping unit including open pipe ends lying on selected ones of said vertical planes, said open pipe ends of each piping unit aligning with corresponding open pipe ends of adjacent piping units in assembly, said piping assembly including removable and adjustable pipe connectors disposed at said open pipe ends for effecting fluid-tight connection of corresponding aligned mating pipes of adjacent piping units in assembly.

2. The piping assembly as in claim 1 wherein each said piping unit is substantially defined by four of said vertical planes, said pallet having a rectangular cross section.

3. The piping assembly as in claim 2 wherein at least some of said pallets of said piping units are arranged adjacent to each other in a grid unit system.

4. The piping assembly as in claim 3 wherein said mounting surface comprises a deck floor including longitudinal and lateral support elements arranged to substantially align with selected ones of said vertical planes, said deck floor having assembly openings, support bases, hatch openings disposed so as to be located in between selected ones of said vertical planes.

5. The piping assembly as in claim 4 wherein each said pallet includes intersecting longitudinal and lateral stiffening beams rigidly fixed to each other at points of their intersection.

6. The piping assembly as in claim 5 wherein said stiffening beams comprise I-beams.

7. The piping assembly as in claim 2 which includes a pipe-free zone in at least one of four corners of the rectangular pallet for facilitating erection.

8. The piping assembly as in claim 5 wherein each said pallet is provided with lifting means fixed to the pallet, for hoisting and lifting the associated piping unit.

9. The piping assembly as in claim 5 wherein interlock openings are provided at said points of intersection.

10. The piping assembly as in claim 9 including mounting columns selectively located at said points of intersection, said columns also supporting a floor which is arranged above the associated piping unit.

11. The piping assembly as in claim 10 wherein at least some of said columns are detachable and are tube shaped, including interlock mechanisms at their lower ends.

12. The piping assembly as in claim 1 wherein each said piping unit is defined substantially by a rectangular grid periphery formed by four intersecting vertical planes, said pallet having a rectangular periphery slightly smaller than said rectangular grid periphery.

13. The piping assembly as in claim 1 wherein each piping unit includes support uprights arranged on an associated pallet, said support uprights being adapted as struts to support selected ones of individual piping units in each piping assembly.

14. The piping assembly as in claim 13 wherein each said support upright comprises a plurality of stacked and fastened blocks, at least some of said blocks having recesses through which pipes can pass and get supported.

15. The piping assembly as in claim 14 wherein the pipes are at least partially arranged in superjacent horizontal planes.

16. The maritime structure as in claim 1 wherein said structure comprises a ship.

17. The maritime structure as in claim 1 wherein said structure comprises a warship.

18. The maritime structure as in claim 1 wherein said structure comprises an offshore rig.

19. A ship with at least one piping system arranged on a deck having a mounting surface located in the interior of the ship for the conveying of fluids, the piping system comprising a plurality of subdivided individual piping units which are assembled at predetermined intervals selectively in the longitudinal and lateral directions along vertical lateral and longitudinal dividing planes, said piping units being disposed on removable pallets located on said mounting surface, open ends of corresponding pipes of adjacent piping units being arranged on vertical dividing planes, the piping system including removable pipe connectors for fluid-tight connection of corresponding mating pipes of adjacent piping units in assembly.

20. The ship according to claim 19 wherein each of said pallets possess a rectangular cross section.

21. The ship according to claim 19 wherein the pallets, with respect to their dimensions, are arranged in a grid unit system.

22. The ship according to claim 21 wherein the horizontal dimensions of the pallets are adapted to a horizontal unit grid which covers a floor plan of the ship and according to which a substantial portion of longitudinal and lateral support elements; bulkheads, and longitudinal walls of said ship are substantially aligned.

23. The ship according to claim 22 wherein a substantial portion of support bases, hatches, assembly and access openings in said ships are substantially aligned with said unit grid.

24. The ship according to claim 23 wherein said pallets are comprised of cross-shaped intersecting lateral and longitudinal beams having preferably equal longitudinal and lateral spacing and rigidly fixed to one another at the points of intersection.

25. The ship according to claim 24 wherein the lateral and longitudinal beams comprise I-beams.

26. The ship according to claim 21 wherein open ends of all pipes in each piping unit are perpendicular with respect to the lateral and longitudinal dividing planes.

27. The ship according to claim 19 wherein the pallets have a somewhat smaller periphery than corresponding piping units.

28. The ship according to Claim 27 wherein lifting means are arranged on the sides of the pallets.

29. The ship according to claim 28 wherein the lifting means comprises lugs arranged on the sides of the pallets inside the periphery of the piping unit.

30. The ship according to claim 29 wherein at least at some points of intersection of the lateral and longitudinal beams, interlock openings are provided.

31. The ship according to claim 30 including mounting columns arranged on the pallet, said columns being selectively located at the points of intersection of the lateral and longitudinal beams, said columns also supporting a floor, which is arranged above the pipes.

32. The ship according to claim 31 wherein the columns are tube-shaped and include interlock mechanisms at their lower ends.

33. The ship according to claim 19 including support uprights arranged on the pallet adapted to the heights of selected individual pipes in each piping unit.

34. The ship according to claim 19 wherein the pipes on the pallet include pipe sections parallel to only one of the dividing planes and right angle bends.

35. The ship according to claim 19 wherein the pipes are at least partially arranged in superjacent horizontal planes.

36. The ship according to claim 19 wherein the dividing planes are subdivided into an orthogonal coordinate grid and the open ends of the pipes are situated only at the coordinate intersection points.

37. The ship according to claim 36 wherein said adjacent coordinate intersection points have equal horizontal and vertical spacings.

38. The ship according to claim 36 wherein the horizontal and vertical spacings of coordinate intersection points are between 10 cm. to 14 cm.

39. The ship according to claim 38 wherein said spacings are about 12 cm.

40. The ship according to claim 19 including erection clearances provided at corners of the pallet.

41. The ship according to claim 40 including erection clearances, free from pipes, furnished within the pallet in the coordinate grid.

42. A piping unit for installation in a maritime structure, said piping unit being supported by a surface located in the interior of said structure, said piping unit being used for conveying fluids, said piping unit to be assembled as a part of a piping system extending in three dimensions within said maritime structure and including a plurality of said individual piping units, said piping system being formed by dividing at least a portion of said maritime structure by at least a first set and a second set of planes, said first set comprising selected ones of a plurality of uniformly spaced vertical planes parallel to one dimension of said maritime structure, said second set comprising selected ones of a plurality of uniformly spaced vertical planes disposed laterally to said first set of planes, said piping unit including pipes mounted on a removable pallet, said removable pallet being mountable in use on said interior surface of said maritime structure, said pipes of said piping unit including open pipe ends being disposed to lie on selected ones of said vertical planes, said open pipe ends of said piping unit to be aligned in assembly with corresponding mating open pipe ends of adjacent piping units, said pipe ends of said piping units being connectable to the pipe ends of said adjacent piping units with pipe connectors which are disposable at said open pipe ends for effecting fluid tight connection in assembly of corresponding aligned mating pipes of said adjacent piping units.

43. The piping unit for installation in a maritime structure according to claim 42 wherein the maritime structure comprises a warship.

44. The piping unit for installation in a maritime structure according to claim 42 wherein said maritime structure comprises an offshore rig.

* * * * *